United States Patent [19]

Hurd

[11] Patent Number: 4,578,678
[45] Date of Patent: Mar. 25, 1986

[54] HIGH DYNAMIC GLOBAL POSITIONING SYSTEM RECEIVER

[75] Inventor: William J. Hurd, La Canada, Calif.

[73] Assignee: The United States of America as represented by the United States National Aeronautics and Space Administration, Washington, D.C.

[21] Appl. No.: 551,536

[22] Filed: Nov. 14, 1983

[51] Int. Cl.$^4$ .......................... G01S 5/02; H04B 7/185
[52] U.S. Cl. ...................................... 343/357; 343/418
[58] Field of Search ............... 343/357, 356, 417, 418, 343/420, 422

[56] References Cited

U.S. PATENT DOCUMENTS 4,468,793  8/1984  Johnson et al. ...................... 343/418

FOREIGN PATENT DOCUMENTS

0083480  7/1983  European Pat. Off. ............ 343/357

*Primary Examiner*—Theodore M. Blum
*Assistant Examiner*—Gregory C. Issing
*Attorney, Agent, or Firm*—Paul F. McCaul; John R. Manning; Thomas H. Jones

[57] ABSTRACT

A GPS receiver having a number of channels, one for each of a plurality of satellites, receives an aggregate of pseudorange code time division modulated signals from some or all satellites and converts the aggregate to baseband and then to digital form for separate processing in the separate channels, each of which includes a complex mixer for adjustment of the baseband signal to a smooth estimate of frequency, $\tilde{\omega}$, for the next measurement interval, and an N-lag cross correlator which receives a replica of the pseudorange code adjusted for a smoothed estimate of the pseudorange (delay), $\tilde{\tau}$. A fast Fourier transform processor computes the signal energy as a function of Doppler frequency for each correlation lag, and a range and frequency estimator computes estimates of pseudorange, $\hat{\tau}$, and frequency, $\hat{\omega}$. These raw estimates from all channels are used to estimate receiver position, velocity, clock offset and clock rate offset in a conventional navigation and control unit, and based on the total solution, that unit computes smoothed estimates, $\tilde{\tau}$ and $\tilde{\omega}$, for the next measurement interval. The smoothed estimates are thus based on the total solution, and not just on the separate estimates of the satellites, all without the use of any phase-locked loop.

5 Claims, 4 Drawing Figures

HIGH DYNAMIC GLOBAL POSITIONING SYSTEM RECEIVER

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a Global Positioning System (GPS) receiver for position and velocity measurement of high dynamic missiles and aircraft, both manned and unmanned, where position measurement error due to acceleration maneuvers at high speed is to be maintained at a low level of approximately 0.2 m/g, or 10 m at 50 g acceleration, with other errors due to random effects comparable to the corresponding errors in conventional GPS receivers, namely receivers using phase-locked loops for tracking GPS carrier and code signals.

Conventional receivers which depend upon phase-locked loops for tracking suffer loss of lock during high dynamic situations, such as high acceleration maneuvers. It has been the practice to aid the phase-locked loop with signals from an inertial navigation system. Other problems with such conventional receivers are excessive lag error due to inadequate navigation filter update rates, and implementation which does not lend itself to a high degree of miniaturization now possible with the rapidly developing technology of very large scale integration (VLSI) of circuits where there is a high degree of symmetry and repetitiveness in the system.

SUMMARY OF THE INVENTION

The dynamic tracking problems with conventional GPS receivers are overcome with a further advantage of a reduction in size (weight and volume) of the receiver, by a highly repetitive architecture which eliminates all phase-locked loops, and which provides near optimum code delay estimation using filters matched to the data modulation. Simplification of the navigation filter is then possible, with the result that a commercially available microprocessor may be used to increase the filter update rate to reduce lag error and thus eliminate the need for any inertial navigation aid. This is achieved by using the "maximum likelihood" method of estimating code delay as a measure of satellite pseudorange and frequency, rather than tracking with carrier phase-locked and code delay-locked loops. (Pseudorange means range plus clock offset, taken in consistent units, and clock offset, due to the receiver not having a clock synchronized with the GPS transmitters, is the same from the receiver to each satellite, since all satellite clocks are synchronized. Time lag, time delay and pseudorange are equivalent.) This enhances the ability to maintain tracking under high receiver dynamics, and allows an all digital implementation suitable for miniaturization, and for a high update rate. Miniaturization can be achieved because of the highly repetitive digital design, suitable for VLSI implementation, thus allowing a reduction in size of the receiver.

In the receiver, the composite of signals from the GPS satellites is amplified and converted to a baseband of lower frequency, demodulated to inphase (I) and quadrature (Q) baseband, and digitized in one pair of analog-to-digital converters. The local oscillator used for the demodulation and the sampling clock operates open loop at the nominal carrier frequency (L-band), and the sampling is carried out at a rate that is a low multiple, preferably two, of the P-code clock rate. The output of the two A/D converters are input to a plurality of identical signal processing channels, one for each of the satellites (typically four) within line of sight for tracking. The detailed discussion in this application is limited to one carrier frequency, called L1 in standard GPS terminology. Extensions to the second, or L2 carrier frequency, and to the C/A-code can be made by direct analogy.

Each signal processing channel implements an approximate maximum likelihood estimation of pseudorange, $\tau$, and frequency, $\omega$, for one satellite. These are called raw estimates, $\hat{\tau}$ and $\hat{\omega}$. The raw estimates are output to a navigation and control unit which converts the raw estimates from the several channels to smoothed estimates of position, velocity, clock offset and clock rate offset, and from these values to smoothed estimates or predictions of pseudorange, $\tilde{\tau}$, and frequency, $\tilde{\omega}$, for each satellite for the next measurement time. The navigation solution for position, velocity, clock offset and clock rate offset is not per se a part of this invention. That navigation solution is conventional. What is new is that the predictions $\tilde{\tau}$ of pseudorange and $\tilde{\omega}$ of frequency are made from the total navigation solution, rather than from the separate raw estimates $\hat{\tau}$ and $\hat{\omega}$, as is inherently done in the prior art of delay locked loops and carrier phase locked loops.

An input-output interface unit which couples the navigation and control unit to the user system also couples initialization and control signals from the user system which are used by the navigation and control unit to obtain all necessary ephemeris data. The ephemeris data are used to calculate initial range and range rate estimates during acquisition and reacquisition of a satellite signal for tracking. The navigation and control unit may also obtain all necessary ephemeris data from data extracted from the satellite signals by the signal processing unit.

Each signal processing channel is comprised of: a single digital sine-cosine generator, preferably quantized to three levels of 1, 0 and −1; a single code generator for generation of a local replica of the satellite P-code; a complex mixer responsive to the sine-cosine generator to translate the frequency of the received signal to near zero frequency; a cross correlator; and a fast Fourier Transform (FFT) processor. The cross correlator is an N-lag correlator, with N chosen to be equal to approximately eight. It forms N lags of the code, multiplies each lag by the frequency translated input signal, and sums the products over one correlation interval. There are typically 32 correlation intervals per data bit time of 20 ms. The FFT processor computes a Fourier transform for each cross correlation lag resulting in detected energy as a function of pseudorange (correlation lag) and Doppler frequency. One commercially available microprocessor with suitable memory may be used to implement all of the FFT implemented Doppler filters needed for one satellite channel.

The energy outputs of the FFTs are analyzed to determine which is maximum. The time lag and Doppler frequency resulting in maximum energy form the basis for determining a rough estimate of pseudorange and frequency, and interpolation is used to refine this estimate to the raw (approximately maximum likelihood) estimates $\hat{\tau}_i$ and $\hat{\omega}_i$, for each data bit time indexed by i. Those estimates are output to a navigation and control unit which produces smoothed estimates of receiver position and velocity, and from those estimates smoothed range and frequency predictions for the next measurement time to the code generator and the sine-cosine generator. There is thus some updating feedback to continue to track satellite signals, but there is not a phase-locked loop. Utilization of feedback from the total navigation solution is less sensitive to temporary loss of signal from one satellite than would be feedback from the individual satellites. Preliminary analysis indicates that receivers accelerating at 50 g or more can track with position error of only 10 m at 50 g. The system can thus track through maneuvers of higher acceleration than a phase-locked loop (PLL) system. Starting out with the input signal at the center of the FFT implemented Doppler filter bank, high dynamics may move the signal energy to other filters, but not out of range of the filter bank, so that the system can still detect the signal where a PLL system of the same bandwidth as one filter of this system would lose lock and require reinitialization. Similarly, the use of $N \approx 8$ correlation lags enables tracking at higher dynamics than with a delay locked loop. Whereas a code tracking delay locked loop may lose lock if dynamics cause error equal to one lag, thus requiring the system to be reinitialized, the present invention implemented with N processing units in each channel, can track with dynamics that cause an error of $\pm N/2$ lags without losing track of the signal. For tracking through a maneuver of 50 g acceleration, with N chosen to be equal to eight, a $\pm 4$ lag error capability is sufficient to maintain tracking.

DESCRIPTION OF PREFERRED EMBODIMENTS

Figure 1:
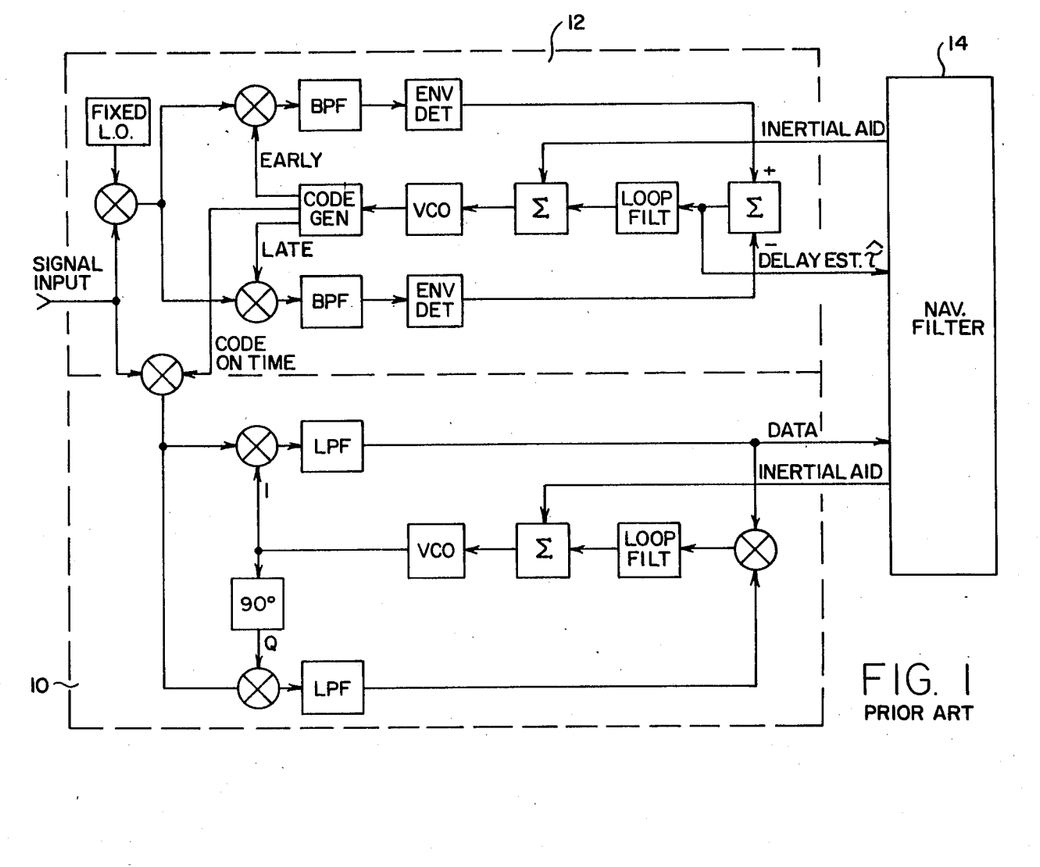
FIG. 1 is a functional block diagram of a prior-art GPS receiver showing one satellite signal channel implemented with Costas phase-locked loops aided by inerital navigation signals.

Referring first to FIG. 1, which shows a block diagram of the tracking portions of a typical GPS receiver, input signal (carrier) is tracked with a Costas loop 10, first described by J. P. Costas, *Synchronous Communications*, Proc. IRE, vol. 44, no. 12, pp 1713–1718, December, 1956, and the code is tracked with a coherent or noncoherent delay-locked loop 12. There is also a data bit synchronization loop (not shown), and these loops must be implemented for each satellite being tracked. During high acceleration maneuvers, wide bandwidth loops must be used in order to track unmodeled dynamics. Since the loop signal-to-noise ratios are low due to the wide noise bandwidths, the loops are vulnerable to loss of lock during weak signal conditions, such as caused by masking of the antenna by the platform, or when the platform orientation causes a satellite to be in a null of the antenna pattern. If a code tracking loop loses lock, it will not reacquire lock by itself, since it is tracking a pseudo random sequence. Reacquisition may take significant time, and the entire receiver position solution is likely to diverge.

In the present invention, temporary loss of signal from one satellite is not serious. The receiver clock is stable enough to enable tracking for several seconds with only three satellites visible, and when the signal from the temporarily lost satellite returns, the feedback provided by the navigation and control unit solution will enable accurate time delay estimates on that signal. Also, if a different satellite becomes visible, the receiver can use this satellite signal without acquisition of phase lock. Loss of tracking is unlikely unless there are less than three satellites visible.

Current GPS receivers update the navigation filter about once per second. This is too slow in a high dynamic environment. The concept of the present invention is to simplify the filter computations by eliminating the acceleration inputs which current receivers require from the host vehicle inertial navigation unit, and by minimizing the number of filter states. At eight state filter could be updated at least ten times per second using a commercially available microprocessor with a floating point hardware chip, and this would be sufficient to achieve good performance with accelerations of 50 g.

An overview of the organization and operation of the present invention while tracking will first be presented with reference to FIG. 2, after which a more detailed description will be given with reference to FIG. 3. Tracking implies that the receiver has all required satellite data, has bit synchronization on the data bits, and has acquired the P-code from each satellite.

The main concept of this invention is to make all time delay estimates using approximate maximum likelihood estimates of pseudorange and range rate to produce separate delay and frequency estimates, $\hat{\tau}$ and $\hat{\omega}$, for the channels 1, 2, 3 and 4 which are directed back from a navigation and control unit to the respective channels without phase locking, thereby eliminating the loss of lock problem, and without any aid from an inertial navigation system. The "open loop" estimates of time delay from each satellite are differential with respect to estimates provided by the receiver's navigation filter, and in this sense the system is closed loop, but there are no phase-locked loops susceptible to loss of lock.

To gain an intuitive understanding of the approximate maximum likelihood method, we need to understand the GPS signal structure. The signal from each satellite is a 50 bps data stream, multiplied by a 10.23 MHz clock rate pseudo random P-code and/or by a 10.23 MHz clock rate clear/acquisition (C/A) code, and then modulated onto two L-band carriers, designated L1 and L2. L1 normally has both P-code and C/A-code, and L2 has one or the other. We consider here processing of the L1 channel P-code, although it is clear that the same circuits could handle the L2 signal and/or the C/A code.

To understand estimation of code time delay, consider the hypothetical situation wherein the exact frequency and phase of the L1 carrier is known, and that the data sequence is known. Then the optimum way to estimate the phase (delay), $\tau$, of the P-code would be to multiply the received signal by the carrier signal and the data bit stream, and then by various shifts, $\tau_n$, of the P-code, and to integrate over some interval. The value of $\tau_n$ which maximizes the integral would be the best estimate of the time delay. In practice, the carrier frequency and phase, and the data bits, are unknown. A common method to overcome this lack of knowledge is to use a noncoherent delay-locked loop. This is a lossy process, because there is an inherent noncoherent signal detection with a wider than optimal bandwidth, i.e., with a bandwidth wide enough to pass the unmodeled Doppler shift as well as the data bits.

The time-delay estimation method of the present invention is to square-law-envelope detect the signal over each data bit time. This detection is done for several frequencies $\omega_m$ covering the region of uncertainty of the signal frequency, and for several phase delays or lags $\tau_n$ of the P-code, covering the region of uncertainty of time delay. The frequency and time delay which maximize the detection function are the estimates $\hat{\omega}_i$ and $\hat{\tau}_i$ of frequency and delay for the measurement time (data bit time) i.

Figure 2:
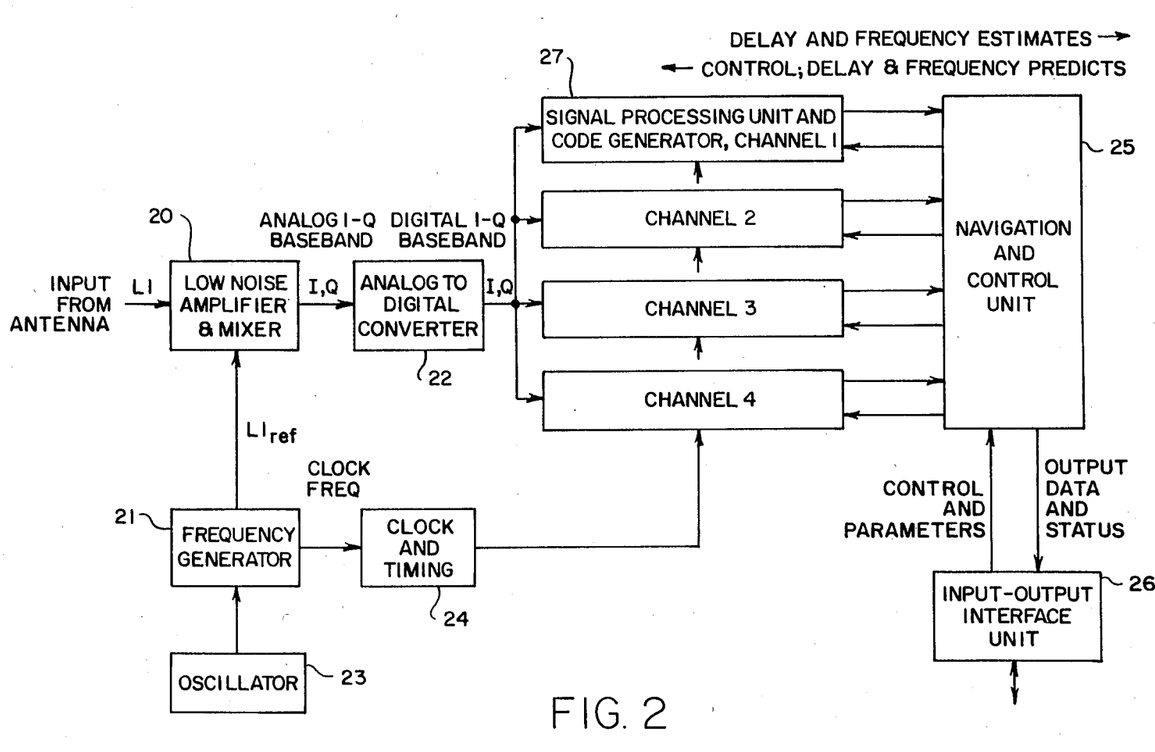
FIG. 2 is a block diagram of a GPS receiver embodying the present invention.

A block diagram of the receiver is shown in FIG. 2. The received L1 signal is translated to inphase and quadrature baseband in a low noise amplifier and mixer 20 using a fixed frequency reference from a generator 21 and then sampled two times per P-code chip, i.e., at 20.46 MHz, by a pair of analog-to-digital converters 22, one for the inphase signal, I, and one for the quadrature signal, Q. An alternate configuration would be to mix to a fixed center frequency of 10.23 MHz, and then sample this one channel at four times per chip. There is only one composite signal channel up to this point, not one channel for each satellite. The local oscillator and the sampling clock are open loop signals at the nominal L1 center frequency and at a low multiple (probably two) of the P-code rate. This is a significant simplification over receivers which demodulate the signals from each satellite separately in phase-locked-loop receiver channels requiring separate frequency controlled oscillators. The receiver has only one oscillator 23 and one timing generator 24. The first amplifier is preferably a low noise FET front end with a system temperature of approximately 100 K, or noise figure of 1.3 dB.

The digital I and Q baseband outputs of the analog-to-digital converter 22 are input to four identical signal processing and code generator units 27, one for each satellite tracking channel. These units implement the approximate maximum likelihood estimation of the pseudorange and range-rate (frequency) to the satellites, and output these to the navigation and control unit 25 each data bit time or every 20 ms.

Note that no programmable or voltage controlled oscillator is required to be synchronized with the clocks of the satellites which are synchronized with each other. The oscillator 23 is a stable, free-running oscillator allowed to be offset from the clock of the satellites and used only to derive a reference frequency, $L1_{ref}$, from the frequency generator 21 and clock and timing signals from a timing unit 24. An input-output interface unit 26 is provided for two-way communication with the host. An all digital design is feasible using LSI, or even VLSI and custom chips. VLSI chips are ideally suited for implementation of the signal processing units because of the repetitive nature of the architecture.

Figure 3:
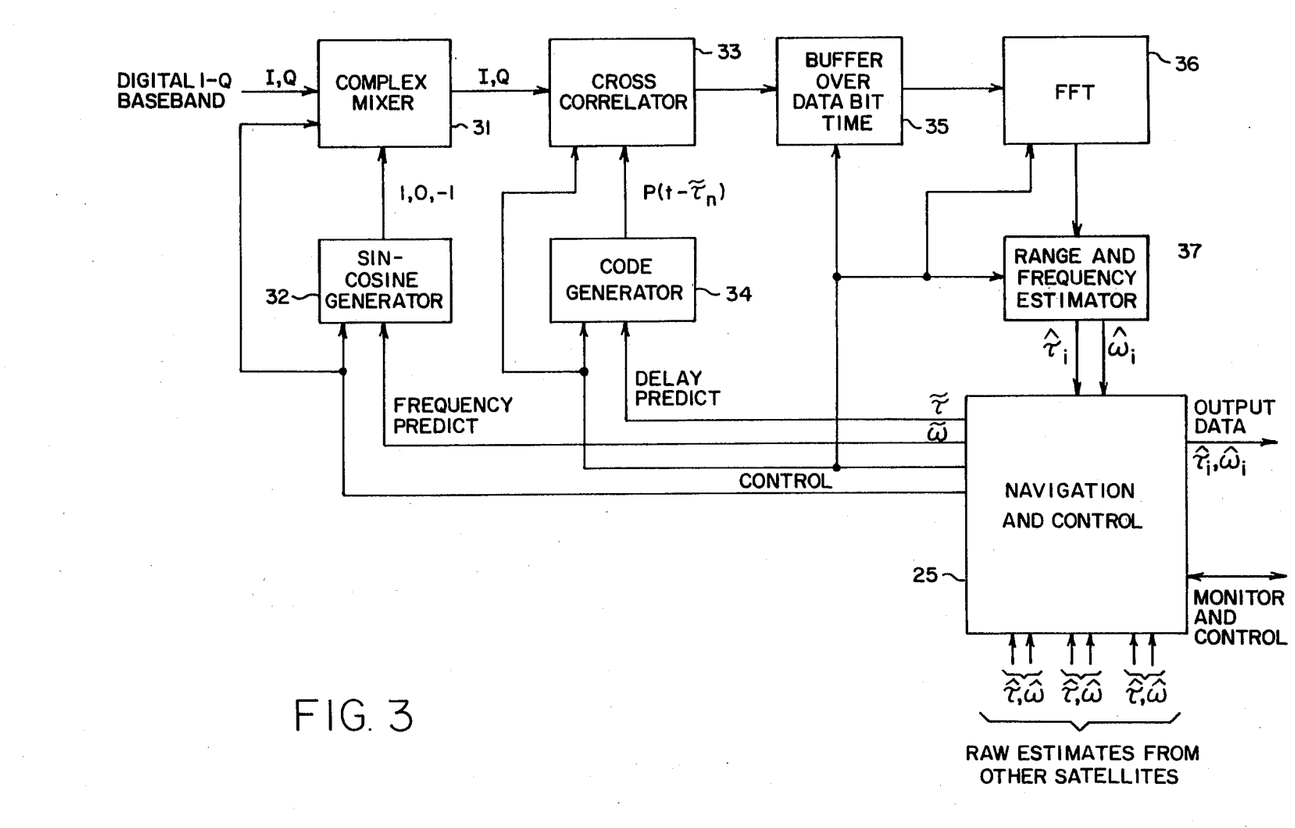
FIG. 3 is a block diagram of the signal processing unit and code generator for the one channel needed for tracking a satellite signal.

A block diagram of the signal processing unit and code generator for one satellite channel is shown in FIG. 3. It is comprised of a complex mixer 31, a sine-cosine generator 32; an N-lag correlator 33 and code generator 34; a buffer 35 for all correlation values over a data bit time; and a fast Fourier transform processor 36. The digital inphase and quadrature baseband signal is input from the complex analog-to-digital converter 22 (FIG. 2) common to all satellite channels. Then the predicted Doppler shift $\tilde{\omega}_i$ from the navigation and control unit 25 is removed by multiplication by $\exp(-j\tilde{\omega}_i t)$ in the complex mixer 31. A three level, 1, 0, $-1$, representation of sine and cosine, generated in 32 is used in the complex mixer 31.

The code generator 34 generates a local replica of the P-code, delayed by the delay predict $\tilde{\tau}_i$ from the navigation and control unit. The Doppler compensated signal is cross correlated against N ($\approx 8$) lags of the code in the N-lag cross correlator 33. The correlation interval is 1/32 of a data bit time. Thus for each data bit time there are 32 correlation values for each of the N code lags. These $32 \times N$ complex numbers are temporarily stored over a data bit time in the buffer 35, and then output one lag at a time to the FFT device 36. The FFT device adds 32 zeros to each 32 point input, and calculates a 64 point Fourier transform. Since the data bit time is 20 ms, this results in the detected energy at 64 frequencies $\omega_m$, spaced by $1/(2 \times 20 \text{ ms}) = 25$ Hz. The FFT energy outputs are maximized over frequency and time delay by a range and frequency estimator 37 which effectively processes energy points arrayed as a function of lag (delay), $\hat{\tau}$, and frequency, $\hat{\omega}$, and estimates the pseudorange, $\hat{\tau}$, and frequency, $\hat{\omega}$, as a function of the nearest neighbors of the maximum energy point such that nearest neighbors of greater energy will shift the estimates $\hat{\tau}$ and $\hat{\omega}$ in the direction of those nearest neighbors, thus referring the maximum likelihood estimates of $\hat{\tau}$ and $\hat{\omega}$ to form coarse estimates and then suitable interpolation is used to form the final raw approximate maximum likelihood estimates $\hat{\tau}_i$ and $\hat{\omega}_i$ for data bit time i, in a range and frequency estimate unit, 37.

The time delay and frequency estimates for each satellite are input to the navigation and control unit 25, which, among other things, outputs predictions of the next values of frequency and time delay to each signal processing unit, i.e., to each satellite tracking channel.

The navigation and control unit 25 interfaces with a system input-output interface unit 26 (FIG. 2), which in turn interfaces with the host, or ground control system. The navigation and control unit 25 accepts initialization and control from the input-output interface unit, and outputs from the signal processing units, only one of which is shown in FIG. 3. It performs all necessary ephemeris, clock and propagation calculations, based either on data received from the I/O interface unit or on data extracted from the satellite data signals. Using this data and the signal processing unit output data, it calculates smoothed receiver position and velocity, and clock offset and rate, and outputs these to the I/O interface unit along with status information. It also controls the signal processing units, and provides them with pseudorange and range-rate estimates during acquisition and reacquisition. During tracking this unit calculates pseudorange and frequency predictions and outputs these to the signal processing units at all times.

Figure 4:
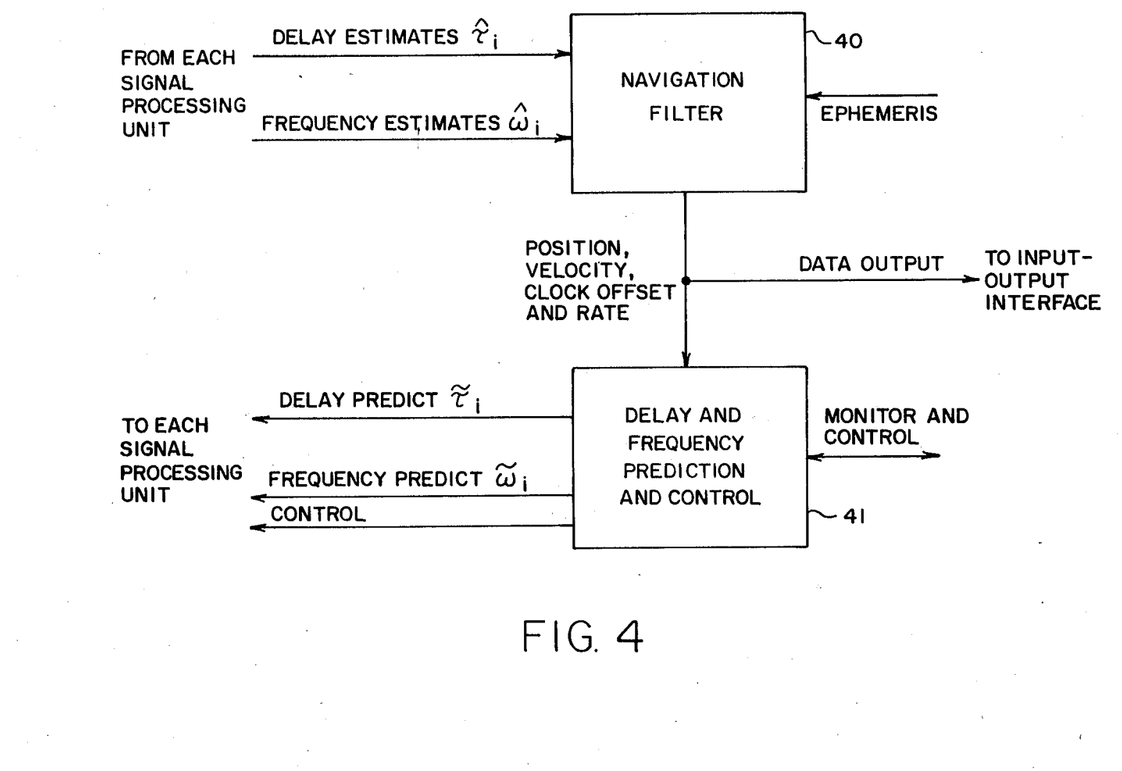
FIG. 4 is a block diagram of the preferred implementation of the navigation and control unit shown in FIG. 3.

A block diagram of the preferred implementation of the navigation and control unit 25 is shown in FIG. 4. A navigation filter 40 accepts raw delay estimates $\hat{\tau}_i$ and frequency estimates $\hat{\omega}_i$ from each signal processing unit each measurement time i. It also accepts ephemeris data from the input-output interface unit, or alternately this data can be extracted from the satellite signals in the signal processing unit, as noted hereinbefore. These data are used to calculate smoothed estimates of receiver position, velocity, clock offset, and clock rate offset. Even during brief periods of signal outage from one satellite, these estimates can be accomplished provided that good signals are sill received from three satellites, and provided that either clock rate offset or receiver altitude remains approximately constant during the signal outage. Thus, the system is less sensitive to temporary loss of signal from one satellite than is a phase-locked loop system which attempts to maintain carrier phase lock and code delay lock independently on each satellite signal.

The smoothed estimates of position, velocity and clock parameters are used by a delay and frequency prediction unit 41 to calculate for each satellite the delay predict $\tilde{\tau}_i$ and the frequency predict $\tilde{\omega}_i$ for the next measurement interval. These predictions are output to the signal processing units for the different satellite channels. Thus, there is feedback from the navigation solution to each signal processing unit, but the system is not a closed loop in the same sense as a phase locked loop system.

DISCUSSION OF DESIGN PARAMETERS

It is important to the detection process that the Doppler frequency not change by more than about one FFT filter bandwidth during the FFT integration time, and that the FFT cover the range of frequency uncertainty. The maximum rate of change of Doppler, neglecting satellite motion and the Earth's rotation rate, is $af_{L1}/c$ where a is acceleration, $f_{L1}$ is the L1 carrier frequency, and c is the speed of light. At an acceleration of 50 g, or 490 m/s$^2$, the maximum Doppler rate is 2600 Hz/s. In one bit time of 20 ms, the frequency can change 52 Hz. This is compatible with the FFT filter bandwidth of 50 Hz. Higher accelerations than 50 g could be handled by detecting over shorter intervals, say one-half bit time.

The Doppler uncertainty is approximately the maximum change in Doppler in two filter update times. For 10 updates per second, this is ±520 Hz, or ±11 filter bandwidths. A FFT over 32 complex samples is more than adequate. This means cross correlation over 32 intervals per bit time is adequate.

The range of Doppler is the sum of the maximum Doppler due to satellite motion and the Earth's rotation, which is 3.7 kHz, plus $vf_{L1}/c$ where v is the maximum receiver vehicle velocity. At v=6600 m/s, or mach 20, the vehicle velocity term is 34.6 kHz, so the total maximum Doppler is under 40 kHz. This is well within the capability of the processing unit.

The FFTs required can easily be accomplished with current technology, using one FFT processor per signal processing unit. Commercially available VLSI processors exist which can accomplish this.

The multiplication by $\exp(j\tilde{\omega}_i t)$ can be done with very low precision. In fact, many similar processing systems use only three level (−1, 0 and 1) representations of the sine-cosine function, with acceptable processing loss. That simplification is considered in the implementation shown in FIG. 3. The required digital circuits would also be custom LSI.

The navigation filter 40 in the navigation and control unit 25 can be implemented on an Intel 8086 microprocessor with an 8087 floating point coprocessor chip. A similar filter, but requiring about one-half as many computations per update, has been implemented on a Z-80 microprocessor at four updates per second. The 8086/8087 combination is about 10 times faster than the Z-80, so a rate of 20 updates per second appears possible. Ten updates per second would be a conservative design.

The receiver architecture, with the delay and FFT circuits, makes it ideally suitable to acquire initial time delay and Doppler, and to perform data bit synchronization. Normally little search would be required as acquisition would be aided by the host aircraft, or airborne missile, or from the ground from a drone. Satellite ephemeris and clock data and ionosphere correction data would also be supplied externally during initialization.

The required initialization search can be done using FFT integration over one-half bit times, so that bit synchronization is not required during search. This process leads naturally to achieving bit synchronization after frequency and code phase are acquired.

The signal from one or more satellites can be masked from the receiving antenna by the host vehicle. When this occurs, the receiver should switch to another satellite, or to a signal from a second receiving antenna. The present invention is ideally suited to accomplish this for the following reasons:

(1) The receiver is constantly measuring the detected power from the satellites, and thus can detect the onset of masking,
(2) The receiver can switch between satellites or antennas at will, because there are no loops to lock up, and
(3) There would be no major increase in complexity to add to the front end circuits, namely the analog-to-digital converter, and a digital multiplex circuit necessary to handle the signals from a second antenna.

If a second antenna is used, consideration should be given to having this antenna receive the L2 signal.

If masking occurs and no additional satellite is visible, even by a second antenna, the receiver can still maintain accurate position for several seconds as long as three satellites are visible. This is possible because the receiver clock is stable enough so that it is not necessary to solve for clock offset continuously, and three satellites are sufficient to solve for three position coordinates.

SIGNAL PROCESSING THEORY

As noted hereinbefore, the GPS satellites transmit pseudonoise signals at two L-band frequencies denoted L1 and L2. Two different pseudonoise signals are used on each satellite, a P-code signal and a C/A code signal. The P-code is a long period pseudonoise sequence with a chip (clock) rate of 10.23 MHz, and the C/A code is a period 1023 pseudonoise code clocked at 1.023 MHz. Both code signals are biphase modulated by binary data at 50 bps. The L1 carrier is phase modulated by both pseudonoise signals, with the C/A code lagging the P-code by 90 degrees. The L1 carrier is modulated by either the P or the C/A signal, but not both at the same time. The L1 carrier frequency is 154 times the P-code chip rate, the L2 carrier frequency is 120 times the P-code chip rate, and all frequencies are phase coherent. On L1, the C/A signal has twice the power of the P-code signal. The carriers are completely suppressed.

The L1 signal can be expressed as $$A_1 D(t)p(t) \cos(\omega_1 t + \phi_1) + B_1 D(t)c(t) \sin(\omega_1 t + \phi_1) \quad (1)$$

where
$A_1$ = P signal amplitude
$B_1$ = C/A signal amplitude
$D(t)$ = data signal at 50 bps p(t) = P-code signal
c(t) = C/A code signal
$\omega_1$ = L1 radian carrier frequency
$\phi_1$ = constant but random carrier phase.

This signal is filtered before transmission to restrict its bandwidth. Reduction in signal strength due to modulation imperfections and due to waveform distortion in a receiver using an ideal 20.46 MHz filter are specified at a total of 1.0 dB. This loss is known as correlation loss.

The receiver receives the transmitted signal delayed by the path length between satellite and receiver, Doppler shifted due to relative velocity, attenuated, and with noise added. The receiver has a different clock than the satellite, and by observing the signal from one satellite only it cannot tell the difference between its clock offset and the signal delay due to range.

When only the P-code signal is present, the received signal r(t) is $$r(t) = AD(t-\tau)p(t-\tau)\cos(\omega(t-\tau)+\phi) + n(t) \quad (2)$$

where
A = amplitude of received L1, P signal
$\tau$ = time delay plus clock offset, proportional to pseudorange
$\phi$ = phase of received L1 signal suppressed carrier
n(t) = white gaussian noise
D(·) = binary data modulation
The transmitter filtering effects are ignored.

Now assume that the signal is observed over a period of time T, such as one data bit time, during which all parameters A, D, $\omega$ and $\phi$, are constant. The parameters of interest for tracking are frequency $(2\pi f = \omega)$ and time delay $(\tau)$, and their maximum likelihood estimates are the values of $\tau_n$ and $\omega_m$ which maximize $$\left| \int_T r(t) p(t-n) e^{-j\omega_m t} dt \right|^2 \quad (3)$$

where n indexes lags and m indexes frequency. The effect of the binary modulation D can be looked on as changing $\phi$ by 180 degrees when D is minus one, and the maximum estimate of net effective phase is the phase of the complex integral. In other words, the likelihood method for the P-code signal is to multiply the received signal by all possible delays of the P-code, and then for each of thee products to measure the energy at all frequencies. The values of time delay and frequency for which the energy is a maximum are the maximum likelihood estimates of these parameters, denoted as $\hat{\tau}_i$ and $\hat{\omega}_i$ in FIG. 3, where i indexes measurement time, i.e., data bit time.

One cannot actually measure the energy at an infinite number of lags and at an infinite number of frequencies. But when the delay and frequency are known to be within some small intervals, it is then practical with current technology to calculate the products for a set of discretely spaced lags within the interval of possible time delays, and for each lag to calculate the energy at a set of discretely spaced frequencies using a Fast Fourier Transform (FFT). This estimation method is called approximate maximum likelihood.

Typical prior-art GPS receivers estimate time delay by tracking the P-code in a delay-locked loop, using two lags of the code to generate an error signal. This type of loop loses lock when the error in tracking time delay exceeds approximately one-half of the lag spacing. If N lags are used in the approximate ML method, good delay estimates can be made when the tracking filter pseudorange error is up to approximately N/2 lags. This improves the ability to track when there are large errors due to vehicle dynamics (up to 50 g for N=8).

The L1 carrier is modulated by both the P-code and the C/A code, and the delays of both signals can be independently estimated by the method presented above. This is not optimum, however, because the time delay, frequency and phases of the two signals have known relationships. In particular, the P and C/A signals have the same carrier frequency and the same delay, and the C/A carrier phase lags the P carrier phase by 90 degrees. The overall maximum likelihood method is to choose the $\tau_n$ and $\omega_m$ which maximize $$\left| \int_T r(t)(p(t-\tau_n) + 2^{1/2}c(t-\tau_n)e^{j\pi/2})e^{-j\omega_m t} dt \right|^2 \quad (4)$$

The factor of the square root of two arises because the C/A signal amplitude is that much higher than the P-code signal amplitude.

Use of the overall maximum likelihood method would yield significant protection against tracking failure under very weak signal conditions, and would yield some improvement in random noise performance under normal SNR conditions. Good performance of the receiver depends on having a high enough SNR so that the lag and the FFT filter which have maximum detected energy are the lag and frequency closest or next closest to the correct answers. Very low SNRs can cause other lags and filters to have maximum energy. Simultaneous detection of the P and C/A code signals increases the effective SNR by about 4.8 dB over the P code only SNR, because the C/A code is twice as strong as the P code. This would improve the threshold performance of the receiver by almost 4.8 dB. Under normal SNR conditions, there would be only a small improvement in random noise performance, because the time delay estimation performance of the P code due to wider bandwidth would dominate.

PERFORMANCE ANALYSES

Preliminary performance analyses have been conducted in order to bound the minimum level of performance which can be achieved. Optimization studies may achieve a higher level of performance than indicated here. From the current analyses, it is anticipated that the receiver will operate acceptable at accelerations to 50 g and at input SNRs of up to 7.6 dB lower than with the minimum specified satellite signal strength and 0 dBi antenna gain. The predicted rms pseudorange error due to receiver noise under these conditions is 0.88 m. This is less than the pseudorange errors due to propagation effects and due to satellite clock and ephemeris errors. The position error due to receiver dynamics is estimated at 0.2 m/g for the second order tracking filter considered, with potential for improvement by use of an improved tracking filter.

The signal-to-noise ratio of interest for performance analysis is the ratio of code power to noise spectral density at the input to the receiver front end. The GPS signal strength is specified such that the power at the output of a 3 dBi antenna is at least $-163$ dBw for L1, P code, $-160$ dBw for L1, C/A code, and $-166$ dBw for L2, either code. This is met whenever the satellite elevation is over 5 degrees and the atmospheric loss is less than 2 dB. This must be degraded by 1 dB for correlation loss due to modulation imperfections and bandwidth limitations. For a 0 dBi antenna, the effective signal strengths are thus 4 dB lower than the above specifications. For a 100 K system temperature front end (noise figure 1.3 dB), the input noise spectral density is −208.6 dBw/Hz. This results in an input SNR of 41.6 dB-Hz for OdBi antenna gain, minimum signal strength, and a 100 K system temperature.

First we consider the random error in the raw estimates of time delay. This error has variance of approximately $$\sigma_T^2 = \frac{N_o T_c^2}{4NPT}$$

where $N_o$ is the noise spectral density, P is the P-code received power, $R_c = 100$ ns is the chip time, $T_D = 20$ ms is the data bit time and $N=2$ is the number of lags per chip time. For a carrier-to-noise ratio of $P/N_o = 34$ dB, which is about 7.6 dB below normal with an omnidirectional antenna and a 100 K system temperature receiver, and allowing 2.8 dB for receiver processing losses, $\sigma_T$ is 6.9 ns, for a distance error of 2.1 m.

Next we consider the tracking filter, which smooths the random error in the raw pseudorange, and determines the dynamic performance. It should be noted that the tracking filter per se is not a part of this invention. There are two extreme methods of tracking the signals from the satellites and forming the navigation solution for position, velocity, perhaps acceleration and clock parameters. The most powerful method is to input the raw observables of pseudorange and range-rate from all satellites observed into a total solution filter which solves simultaneously for all the navigation parameters. The filter is typically a Kalman filter, or some modification thereof. The second extreme method is to track the dynamics of the signal from each satellite separately, forming smoothed estimates of pseudorange, velocity and perhaps acceleration, and then to form a memoryless flash solution for the navigation parameters, without further smoothing. This method is not as powerful as a general Kalman filter, but it often has distinct implementation advantages without significant loss is performance. Many navigation receivers use a combined method, in which the individual signals are tracked and smoothed in phase-locked loops, and then the loop outputs are further smoothed in the navigation filter. The method has the advantage over the first method that the filter update rate does not have to be as high because the raw data are smoothed.

Although not the preferred realization, for the purpose of bounding the performance of the present invention, it is sufficient to consider one filter type, namely the second type: separate tracking filters for each satellite, followed by a flash navigation solution. It is also sufficient to consider the tracking filter only, since the maximum navigation filter position error due to dynamics is equal to the maximum position error in one tracking filter, and since the error in position solution due to random noise is equal to the pseudorange error multiplied by a geometric factor which does not depend on filter type.

More specifically to bounding performance of this invention, a type two second order filter with both poles at the same location is sufficient, using only range and not range-rate as the input. This filter is characterized by one parameter, and when the update rate is sufficiently high this parameter is effectively a time constant, $\tau_f$. This is valid when the time between updates is small compared to $\tau_f$. The steady state response of this filter to dynamics is as follows. It tracks constant velocity with no range error, and constant acceleration with range error equal to a $\tau_f^2$ where a is acceleration in m/s$^2$. A time constant of 0.14 s would result in a range error due to acceleration of 0.2 m/g, or 10 m at 50 g acceleration. The dynamic response could be improved by using a third order filter, which could track constant acceleration with no range error, and constant jerk with a range error proportional to jerk.

The response of the filter to random noise is to reduce rms range error by a factor of 1.12 times the square root of $\tau_f$ divided by the time between inputs. Thus, for a time constant of 0.14 s and an update rate of once per data bit time, and raw range errors are reduced by a factor of 2.37. With the nominal expected processing losses, and for any acceleration of less than 50 g, the final estimated pseudorange error due to random noise is 0.44 m at an input SNR of 40 dB-Hz and 0.88 m at an SNR of 34 dB-Hz, compared to the nominal input SNR of 41.6 dB-Hz.

It may be noted that there is a discrepancy between the filter in this performance analysis and the actual filter to be implemented. The simple filters here smooth the signal from one satellite at a time, rather than simultaneously soloing for position and smoothing. Because of this simplification, they can be updated more rapidly than the actual filter. Nevertheless, the actual filter will be more powerful than the filters considered here, so the performance will be at least as good in terms of noise and dynamic performance. Furthermore, the actual filter will have advantages during possible short periods of low signal strength from one satellite, as previously discussed.

What is claimed is:

1. In a receiver for a navigation system using a number of satellites which synchronously transmit pseudorange codes that are code division multiplexed on a carrier frequency, said receiver having means for amplifying the aggregate of the signals from said satellites, and converting said aggregate to baseband, means for demodulating said baseband to inphase and quadrature signals, means for converting said inphase and quadrature signals from analog to digital form, a separate signal processing channel for each satellite signal received, and navigation means responsive to pseudorange and frequency estimates from all of said channels for computing smoothed estimates of receiver position, velocity, clock offset and clock rate offset, a method for navigation tracking with said channels in parallel comprising the steps of computing in each channel the maximum likelihood estimation of pseudorange, $\hat{\tau}$, to a satellite, and the frequency, $\hat{\omega}$, of the satellite at baseband during a measurement time, computing smoothed estimates of receiver position, velocity, clock offset and clock rate offset from the maximum likelihood estimates $\hat{\tau}$ and $\hat{\omega}$, and data from said navigation means to predict pseudorange $\tilde{\tau}$ and frequency $\tilde{\omega}$ for the next measurement time for each satellite, adjusting the digital baseband inphase and quadrature signals to a predicted frequency for the next measurement time in response to said smoothed estimate $\tilde{\omega}$ of frequency, and adjusting the phase of a code generator for generating a replica of the satellite pseudorange code with a predicted delay for the computation of the maximum likelihood estimate of pseudorange, $\hat{\tau}$, in the next measurement time in response to said smoothed estimate $\tilde{\tau}$ of pseudorange.

2. A method as defined in claim 1 wherein computing the maximum likelihood estimation of pseudorange, $\hat{\tau}$, and frequency, $\hat{\omega}$, is accomplished by computing the cross correlation of the digital inphase and quadrature signal against a local replica of the code for each of N cross correlation lags, computing the signal energy as a function of Doppler frequency for each correlation lag, determining the point of maximum energy for a distinct lag and frequency, and from said point of time lag and Doppler frequency that resulted in a maximum energy, and also from adjacent energy points arranged in terms of lag versus frequency, determining said maximum likelihood estimation of pseudorange $\hat{\tau}$ and frequency, $\hat{\omega}$.

3. In a receiver for a navigation system using a number of satellites which synchronously transmit pseudorange codes that are code division multiplexed on a carrier frequency, said receiver having means for amplifying the aggregate of the signals from said satellites, and converting said aggregate to baseband, means for demodulating said baseband to inphase and quadrature signals, means for converting said inphase and quadrature signals from analog to digital form, a separate signal processing channel for each satellite signal received, and navigation means responsive to pseudorange and frequency estimates from all of said channels for computing smoothed estimates of receiver position, velocity, clock offset and clock rate offset for navigation tracking with said channels in parallel, an improvement comprising means for computing in each channel the maximum likelihood estimation of pseudorange, $\hat{\tau}$, to a satellite, and the frequency, $\hat{\omega}$, of the satellite at baseband during a measurement time, means for computing smoothed estimates of receiver position, velocity, clock offset and clock rate offset, means for predicting pseudorange $\tilde{\tau}$ and frequency $\tilde{\omega}$ for the next measurement time for each satellite from the maximum likelihood estimates $\hat{\tau}$ and $\hat{\omega}$, and also from said position, velocity, clock offset and clock rate offset data, means for adjusting the digital baseband inphase and quadrature signals to a predicted frequency for the next measurement time in response to said smoothed estimate $\tilde{\omega}$ of frequency, and means for adjusting the phase of a code generator for generating a replica of the satellite pseudorange code with a predicted delay equal to said smoothed estimate of pseudorange, $\tilde{\tau}$, for the next measurement time.

4. An improvement as defined in claim 3 wherein said means for computing the maximum likelihood estimation of pseudorange, $\hat{\tau}$, and frequency, $\hat{\omega}$, is comprised of means for computing the cross correlation of the digital inphase and quadrature signal against a local replica of the code for each of N cross correlation lags, means for computing the signal energy as a function of Doppler frequency for each correlation lag, means for determining the point of maximum energy for a distinct lag and frequency, and from the point of time lag and Doppler frequency that resulted in a maximum energy, and further from adjacent energy points arrayed in terms of lag versus frequency, means for determining said maximum likelihood estimation of pseudorange $\hat{\tau}$ and frequency $\hat{\omega}$.

5. A GPS receiver having K channels, one for each of K satellites, means for receiving an aggregate of pseudorange code time division modulated signals from said satellites, and means for converting the aggregate signal to baseband, means for converting said baseband signal to digital form for separate processing in said K channels, each of which includes a complex mixer for adjustment of the digital baseband signal to a predicted frequency, $\tilde{\omega}$, for the next measurement interval, means for generating a replica of the satellite pseudorange code adjusted for a smoothed estimate of pseudorange delay, $\tilde{\tau}$, an N-lag cross correlator responsive to said smoothed pseudorange delay, $\tilde{\tau}$, means for computing the signal energy as a function of Doppler frequency for each correlation lag, means for computing maximum likelihood estimates of pseudorange, $\hat{\tau}$, and frequency, $\hat{\omega}$, from the maximum signal energy point and adjacent points, means for using these estimates from all channels to estimate receiver position, velocity, clock offset and clock rate offset in a conventional manner, and based on the total navigation solution computing said smoothed estimates, $\tilde{\tau}$ and $\tilde{\omega}$, for the next measurement interval.

* * * * *